US009645581B1

(12) United States Patent
Yang et al.

(10) Patent No.: US 9,645,581 B1
(45) Date of Patent: May 9, 2017

(54) METHOD AND APPARATUS FOR NAVIGATING UNMANNED AERIAL VEHICLE

(71) Applicant: ZEROTECH (Shenzhen) Intelligence Robot Co., Ltd, Shenzhen (CN)

(72) Inventors: Jianjun Yang, Beijing (CN); Mingliang Feng, Beijing (CN)

(73) Assignee: ZEROTECH (Shenzhen) Intelligence Robot Co., Ltd, Longgang District, Shenzhen (CN)

( * ) Notice: Subject to any disclaimer, the term of this patent is extended or adjusted under 35 U.S.C. 154(b) by 0 days.

(21) Appl. No.: 15/176,158

(22) Filed: Jun. 8, 2016

(30) Foreign Application Priority Data

Feb. 4, 2016 (CN) ............................ 2016 1 0078150
Mar. 16, 2016 (CN) ............................ 2016 1 0151544

(51) Int. Cl.
*G06F 7/00* (2006.01)
*G05D 1/10* (2006.01)
*B64C 39/02* (2006.01)
*G08G 5/00* (2006.01)

(52) U.S. Cl.
CPC ........... *G05D 1/101* (2013.01); *B64C 39/024* (2013.01); *G08G 5/0069* (2013.01); *B64C 2201/141* (2013.01); *B64C 2201/146* (2013.01)

(58) Field of Classification Search
CPC combination set(s) only.
See application file for complete search history.

(56) References Cited

U.S. PATENT DOCUMENTS

| 4,772,832 | A * | 9/1988 | Okazaki | G05D 1/0272 |
| | | | | 318/587 |
| 4,866,617 | A * | 9/1989 | Matsuda | G05D 1/0246 |
| | | | | 180/169 |
| 8,396,730 | B2 * | 3/2013 | Khosla | G06Q 10/0631 |
| | | | | 705/7.11 |
| 8,788,121 | B2 * | 7/2014 | Klinger | G05D 1/104 |
| | | | | 701/3 |
| 9,387,928 | B1 * | 7/2016 | Gentry | B64C 39/024 |
| 9,412,278 | B1 * | 8/2016 | Gong | H04L 63/101 |
| 2008/0306680 | A1 * | 12/2008 | Marty | G01C 21/00 |
| | | | | 701/533 |
| 2009/0210109 | A1 * | 8/2009 | Ravenscroft | G01C 21/005 |
| | | | | 701/26 |

(Continued)

*Primary Examiner* — Jonathan L Sample
(74) *Attorney, Agent, or Firm* — Jun He Law Offices P.C.; James J. Zhu (57) ABSTRACT

A method for navigating an unmanned aerial vehicle (UAV) from an initial position of the UAV towards a base position comprises A) flying the UAV to a plurality of destination positions each having a first predetermined distance from the initial position of the UAV, wherein the plurality of destination positions correspond to a plurality of trial directions with respect to the initial position, respectively; B) detecting, for each of the plurality of destination positions, a distance from the base position to the destination position when the UAV is at the destination position, thereby to obtain a plurality of detected distances corresponding to the plurality of trial directions, respectively; C) determining a return direction of the UAV on the basis of the plurality of detected distances; and D) flying the UAV a second predetermined distance along the return direction.

29 Claims, 8 Drawing Sheets

(56) References Cited

U.S. PATENT DOCUMENTS

| | | | | |
|---|---|---|---|---|
| 2010/0114633 A1* | 5/2010 | Sislak | G06Q 10/047 | 701/120 |
| 2010/0127883 A1* | 5/2010 | Chou | G01S 1/68 | 340/686.1 |
| 2010/0198514 A1* | 8/2010 | Miralles | F41G 7/008 | 701/302 |
| 2011/0035086 A1* | 2/2011 | Kim | G05D 1/0238 | 701/23 |
| 2011/0147515 A1* | 6/2011 | Miller | B64C 39/028 | 244/63 |
| 2011/0246116 A1* | 10/2011 | Kamitani | G01S 7/4865 | 702/97 |
| 2012/0158280 A1* | 6/2012 | Ravenscroft | G01C 21/005 | 701/400 |
| 2012/0209652 A1* | 8/2012 | Khosla | G06Q 10/0631 | 705/7.16 |
| 2012/0271778 A1* | 10/2012 | Atkins | G06Q 10/04 | 705/337 |
| 2013/0240673 A1* | 9/2013 | Schlosser | G05D 1/101 | 244/137.1 |
| 2014/0022051 A1* | 1/2014 | Levien | A61M 5/20 | 340/5.2 |
| 2014/0024999 A1* | 1/2014 | Levien | G05D 1/00 | 604/66 |
| 2014/0025236 A1* | 1/2014 | Levien | G05D 1/00 | 701/3 |
| 2014/0081505 A1* | 3/2014 | Klinger | G08G 1/162 | 701/25 |
| 2014/0172194 A1* | 6/2014 | Levien | G08G 5/0091 | 701/2 |
| 2014/0316616 A1* | 10/2014 | Kugelmass | G05D 1/101 | 701/8 |
| 2014/0323038 A1* | 10/2014 | Hubbell | H04W 40/20 | 455/11.1 |
| 2015/0134234 A1* | 5/2015 | Kim | G01S 13/931 | 701/408 |
| 2015/0269520 A1* | 9/2015 | Knapp | G06Q 10/08355 | 705/338 |
| 2015/0301532 A1* | 10/2015 | Norris | H04L 67/12 | 701/23 |
| 2015/0304869 A1* | 10/2015 | Johnson | H04W 24/08 | 701/2 |
| 2015/0346722 A1* | 12/2015 | Herz | G05D 1/0038 | 701/2 |
| 2016/0068264 A1* | 3/2016 | Ganesh | G08G 5/0069 | 701/2 |
| 2016/0070265 A1* | 3/2016 | Liu | B64C 39/024 | 701/3 |
| 2016/0107750 A1* | 4/2016 | Yates | B64C 39/024 | 244/2 |
| 2016/0163204 A1* | 6/2016 | Raptopoulos | G08G 5/0069 | 701/3 |
| 2016/0189101 A1* | 6/2016 | Kantor | G08G 5/0013 | 705/338 |
| 2016/0200438 A1* | 7/2016 | Bokeno | B64D 1/08 | 244/2 |
| 2016/0216711 A1* | 7/2016 | Srivastava | B64D 1/02 | |
| 2016/0225264 A1* | 8/2016 | Taveira | B64C 39/024 | |
| 2016/0232794 A1* | 8/2016 | Hafeez | G08G 5/0034 | |
| 2016/0253907 A1* | 9/2016 | Taveira | G08G 5/006 | 701/3 |

* cited by examiner

METHOD AND APPARATUS FOR NAVIGATING UNMANNED AERIAL VEHICLE

CROSS REFERENCE TO RELATED APPLICATIONS

This application claims priority to Chinese Patent Application Number 201610078150.3 filed on Feb. 4, 2016, and Chinese Patent Application Number 201610151544.7 filed on Mar. 16, 2016, the entire contents of which are incorporated herein by reference.

TECHNICAL FIELD

The present application relates to unmanned aerial vehicle (UAV) technology, and more particularly to a method and apparatus for navigating a UAV, and a UAV employing such method and apparatus.

BACKGROUND

An unmanned aerial vehicle (UAV), also referred to as an unmanned drone or drone, is an aircraft that does not carry a human operator and is remotely piloted by an external operator on the ground. The typical UAVs are usually deployed for military/civil special operation applications such as policing, scientific research or inspection of security dangers, etc.

In consideration of various factors such as flight duration, positioning accuracy and signaling distance, it may be desirable to permit the typical UAVs to fly only within a confined scope. Accordingly, several methods have been developed to initiate a return flight towards the operator when the UAV is at or near a boundary of the confined scope. For example, when it is detected that the distance from the UAV to the operator is equal to or greater than a predetermined threshold, a control instruction may be generated automatically to instruct the UAV to fly to the operator. For such conventional methods, the flight direction of the return flight of the UAV may not change during the return flight because the position of the operator may be considered as a fixed position. However, it frequently happens that the operator moves around during the return flight of the UAV, for example, the operator may be in a car or on a train. Thus, the UAV is not be able to track the position change of the operator in some conditions, and therefore can not accurately fly back to the operator.

Thus, there is a need for further improvement of the UAVs.

SUMMARY

An objective of the present application is to provide a navigation method and apparatus that can accurately navigate a UAV to fly from an initial position towards a base position.

In a first aspect of the present application, there is disclosed a method for navigating a UAV from an initial position of the UAV towards a base position. The method comprises: A) flying the UAV to a plurality of destination positions each having a first predetermined distance from the initial position of the UAV, wherein the plurality of destination positions correspond to a plurality of trial directions with respect to the initial position, respectively; B) detecting, for each of the plurality of destination positions, a distance from the base position to the destination position when the UAV is at the destination position, thereby to obtain a plurality of detected distances corresponding to the plurality of trial directions, respectively; C) determining a return direction of the UAV on the basis of the plurality of detected distances; and D) flying the UAV a second predetermined distance along the return direction.

In a second aspect of the present application, there is disclosed an apparatus for navigating a UAV from an initial position of the UAV towards a base position, the apparatus comprising a processor and a memory for storing executable instructions that, when executed by the processor, causes the UAV to perform: A) flying the UAV to a plurality of destination positions each having a first predetermined distance from the initial position of the UAV, wherein the plurality of destination positions correspond to a plurality of trial directions with respect to the initial position, respectively; B) detecting, for each of the plurality of destination positions, a distance from the base position to the destination position when the UAV is at the destination position, thereby to obtain a plurality of detected distances corresponding to the plurality of trial directions, respectively; C) determining a return direction of the UAV on the basis of the plurality of detected distances; and D) flying the UAV a second predetermined distance along the return direction. The apparatus can be implemented on a UAV or a remote terminal.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the present application. It should be understood that, the various aspects of the present application described and graphically presented herein may be arranged, replaced, combined, divided and designed in many different configurations, and these different configurations are implicitly included in the present application.

Figure 1:
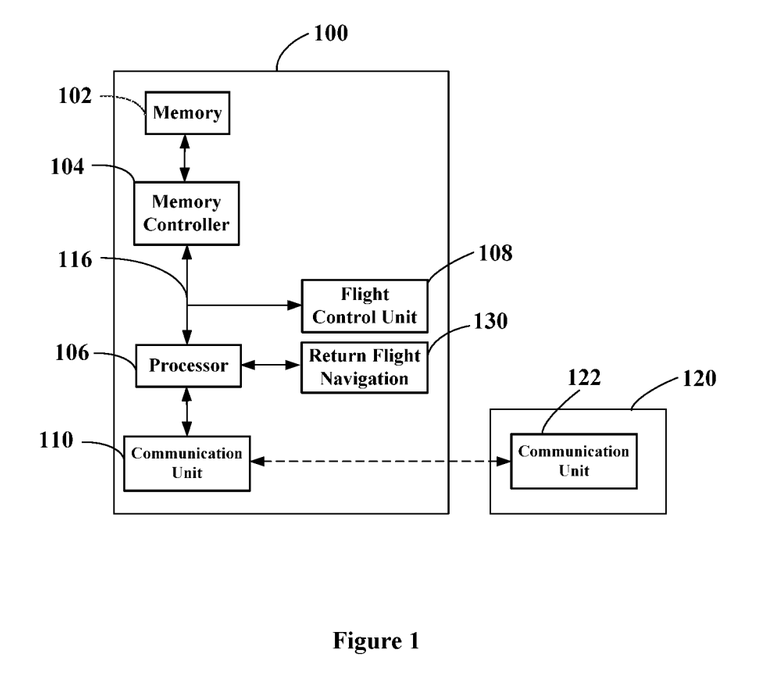
FIG. 1 shows a block diagram of a UAV according to an embodiment of the present application.

FIG. 1 shows a block diagram of a UAV 100 according to an embodiment of the present application.

As shown in FIG. 1, the UAV 100 may include a memory 102, a memory controller 104, a processor 106, a flight control unit 108 and a communication unit 110. At least a portion of these components may be coupled with each other via a signal bus or respective signal lines 116 to implement data interaction and communication therebetween.

The memory 102 may store software programs such as a software program corresponding to a method for navigating a UAV according to an embodiment of the present application. The software program may include a plurality of instructions executable by the processor 106. The processor 106 may execute the software program(s) stored in the memory 102 to implement various functions and data processing, such as the method for navigating UAVs according to the embodiment of the present application.

The memory 102 may also receive and store other types of data under the control of the memory controller 104. The memory 102 may be a non-transitory storage medium, e.g. a Random Access Memory (RAM), a Read Only Memory (ROM), a Programmable ROM (PROM), an Erasable PROM (EPROM) or an Electric EPROM (EEPROM). Furthermore, the processor 106 may access to the memory 102 under the control of the memory controller 104 to read data from the memory 102 or write data into the memory 102.

In some embodiments, the processor 106 may be an integrated circuit (IC) chip with signal and data processing functionality. The processor 106 may be a general-purpose processor such as a Central Processing Unit (CPU) or a network processor, or dedicated logics such as a Digital Signal Processing (DSP), an Application Specific IC (ASIC), a Field Programmable Gate Array (FPGA) or the like. The processor 106 can be used to implement the navigation methods and apparatuses according to the embodiments of the present application.

The flight control unit 108 is used to control the UAV 100 to perform various types of flights as instructed by the processor 106. In some embodiments, the flight control unit 108, the processor 106 and the memory controller 104 may be implemented within a single chip, or alternatively, as separate chips.

The communication unit 110 enables the UAV 100 to communicate with a remote terminal or a remote console 120 having a communication unit 122 via wireless signals. In some embodiments, the communication unit 110 may have video communication functionality to transmit image data or video data to the remote terminal 120. The communication units 110 and 122 may include any number of transmitters, receivers and/or transceivers suitable for wireless communication. The communication may be one-way communication. Preferably, the communication may be two-way communication, such that data can be transmitted in both directions between the UAV 100 and the remote terminal 120.

The UAV 100 may further include a motion detecting unit (not shown) coupled to the processor 106, which is used to detect the motion status of the UAV 100 and generate one or more motion parameters indicative of the detected motion status of the UAV 100. For example, the motion detecting unit may include an inertial measurement sensor, an altitude sensor, a positioning sensor, a distance sensor, an ultrasound transducer, an infrared sensor, an optical sensor, and any other suitable motion detecting devices. The motion parameters of the UAV 100 may include, without limitation, position, altitude, velocity, speed, acceleration or orientation of the UAV 100, or change in position, altitude, velocity, speed, acceleration or orientation of the UAV 100. The detected motion status of the UAV 100 may be transmitted to the processor 106 and/or stored in the memory 102 for subsequent processing. Additionally, the UAV 100 may calculate its flight path using the detected motion status of the UAV 100 within a period of time, and store such flight path in the memory 102. Furthermore, at each point of the flight path, the velocity (including direction of flight) and/or orientation of the UAV 100 may be recorded as well.

The UAV 100 may further include a return flight navigation apparatus 130, which is used to implement a method for navigating the UAV from an initial position towards a base position according to embodiments of the present application, either independently or with other components of the UAV 100. In some embodiments, the return flight navigation apparatus 130 may be alternatively integrated within the processor 106 and/or the flight control unit 108. In some alternative embodiments, all or a portion of the return flight navigation apparatus 130 may be implemented within the remote terminal 120 as the remote terminal 120 may integrated therewith data and signal processing functionalities as well.

Figure 2:
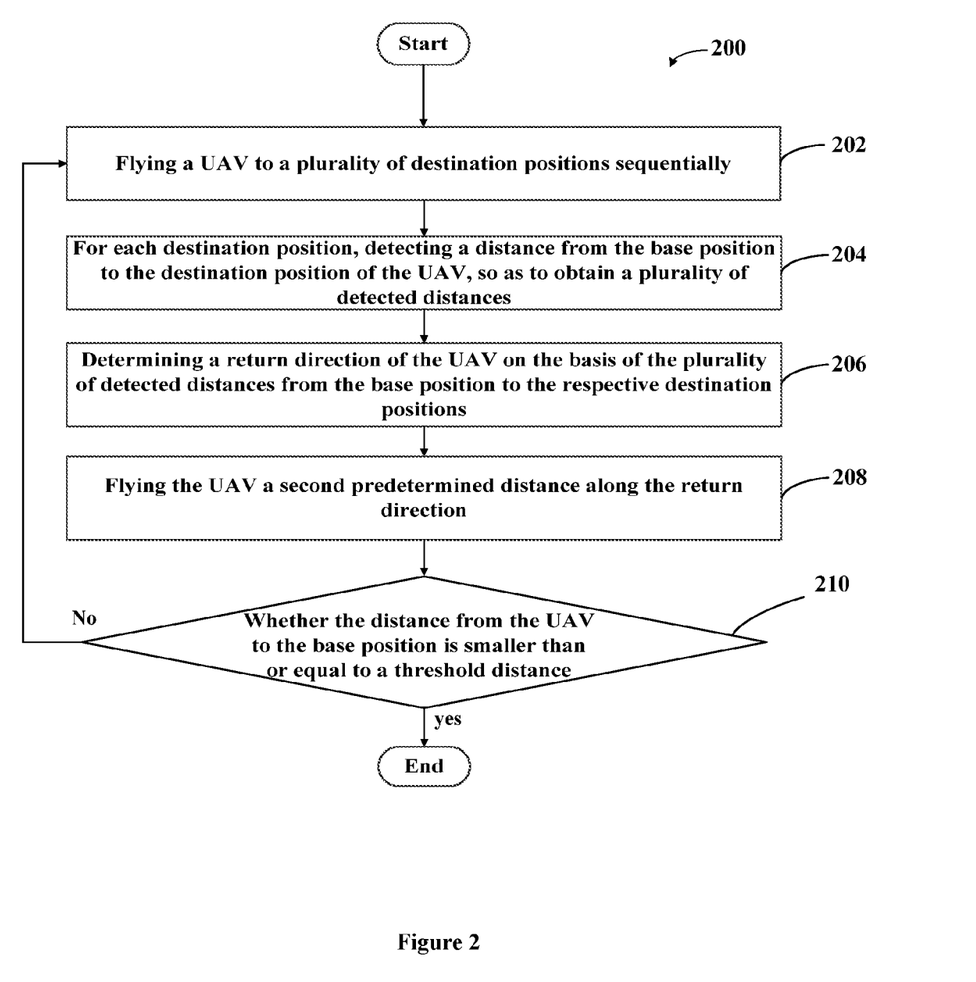
FIG. 2 shows a flow chart of a method for navigating a UAV according to an embodiment of the present application.

FIG. 2 shows a flow chart of a method 200 for navigating a UAV from an initial position towards a base position according to an embodiment of the present application. The base position is a target position where the UAV is expected to move to, for example, a position where an operator of the UAV stands or where a remote terminal is located. In some examples, the base position may be fixed. In some other examples, the base position may move during the return flight of the UAV. For example, the remote terminal may be moved with the operator, thereby changing the base position. The method 200 may be performed by the return flight navigation apparatus 130 and some other components of the UAV 100 shown in FIG. 1, or performed by the remote terminal 120.

In a typical situation, a return command instructing the UAV to fly back towards the base position may be received by the UAV, for example, when the operator gives the return command to the remote terminal and the remote terminal further transmits the return command to the UAV. Alternatively, the return command may be automatically generated by the UAV when it flies close to or out of a boundary of a predetermined scope. In other words, the UAV is permitted to fly within the predetermined scope only. As long as the return command is received or generated, the UAV may hover in the air, and the position where the UAV hovers can be regarded as the initial position of the UAV.

As shown in FIG. 2, in response to the return command, in step 202, the UAV flies to a plurality of destination positions sequentially. Each of the plurality of destination positions has a first predetermined distance from the initial position of the UAV, and the plurality of destination positions corresponds to a plurality of trial directions with respect to the initial position, respectively.

In an embodiment, the UAV selects a first trial direction with respect to the initial position, either randomly or based on a predetermined rule. The UAV then flies along the first trial direction the first predetermined distance. The first predetermined distance may be 0.5 meter, 1 meter, 2 meters, 3 meters, 5 meters, 10 meters or longer depending on the various factors such as the distance from the initial position to the base position. The first trial direction may be in a horizontal plane, in a vertical plane or in a same plane with the base position. In some embodiments, the UAV may detect in real time its speed, and calculate a flight distance travelled by itself according to the detected speed and a time of flight.

When the flight distance of the UAV is equal to the first predetermined distance, the UAV arrives at a first destination position of the plurality of destination positions, which corresponds to the first trial direction. Thus, the UAV stops flying along the first trial direction.

Next, in step 204, a distance from the base position to a destination position of the UAV is detected.

For example, when the UAV is at the first destination position, it detects the distance from the first destination position to the base position.

The distance between the first destination position and the base position can be detected in various manners. In an example, if the remote terminal is positioned at the base position, the UAV may transmit a distance measurement signal to the remote terminal. The distance measurement signal may contain a first time at which the distance measurement signal is transmitted by the UAV. The remote terminal may receive the distance measurement signal and record a second time at which the distance measurement signal is received. The remote terminal may then calculate the distance between the first destination position and the base position according to the first time, the second time and the speed of an electromagnetic wave (e.g. about $3*10^8$ m/s) in the air.

Alternatively, the remote terminal may transmit a distance measurement signal containing a first time at which it is transmitted by the remote terminal, and the UAV may receive the distance measurement signal and record a second time at which the distance measurement signal is received. With the first time and the second time, the UAV may calculate the distance between the first destination position and the base position. Such distance measurement methods can accurately detect the relative distance between the UAV and the remote terminal, and do not require a GPS device, which reduces the cost of distance measurement.

As another alternative example, the remote terminal and/or the UAV may use a GPS device to detect the distance from the first destination position to the base position. The GPS device may detect a coordinate of the first destination position when the UAV is at the first destination position, and then the distance from the first destination position to the base position can be calculated on the basis of the respective coordinates of the two positions in the GPS coordinate system. Also, the first trial direction corresponding to the first destination position can be determined according to the coordinates of the first destination position and the initial position in the GPS coordinate system.

After the distance from the first destination position to the base position has been detected, the UAV may store the detected distance and the first trial direction for subsequent processing. For example, the detected distance and the first trial direction can be stored within the memory 102 of the UAV 100 shown in FIG. 1.

In some embodiments, the UAV may fly back to its initial position after flying the first predetermined distance along the first trial direction to the first destination position. Next, the UAV may select a second trial direction with respect to the initial position. The second trial direction may have an angle, e.g. 15 degrees, 30 degrees, 45 degrees, 60 degrees, 90 degrees, 120 degrees or 150 degrees, with respect to the previous first trial direction. Preferably, the second trial direction may be in the same plane with the first trial direction. For example, if the first trial direction is in a vertical plane, the second trial direction can be in the vertical plane as well. Similarly, the UAV may fly the first predetermined distance along the second trial direction until it arrives at a second destination position. Next, the UAV may detect the distance from the second destination position to the base position. In practice, the UAV may repeat the flying and distance detecting process several times to obtain a plurality of detected distances between the base position and the respective destination positions of the plurality of trial directions.

In one preferable embodiment, the plurality of trial directions are in the same plane, and thus the destination positions may be approximately located at a circle centered at the initial position of the UAV. For example, the destination positions may distributed as two or three vertices of a regular triangle, two, three or four vertices of a square, or two or more vertices of a regular multi-sided polygon. In an alternative embodiment, the plurality of trial directions may not be in the same plane, and thus, the destination positions may be approximately located at a surface of a sphere centered at the initial position of the UAV.

In some other embodiments, the UAV does not fly back to its initial position after flying the first predetermined distance along the first trial direction. Instead, the UAV may calculate several destination positions corresponding to a plurality of trial directions with respect to the initial position of the UAV. Specifically, after flying to the first destination position, the UAV may fly directly from the first destination position to a second destination position so as to detect a distance from the second destination position to the base position. In other words, the UAV's previous flight track is taken into account in order to adjust a next trial direction and the distance to be flied along the next trial direction. Such adjustment might be conducted in advance so that the UAV flies along predetermined adjusted trial directions and distances. Or, such adjustment can be conducted in real time on the basis of the UAV's current flight track.

Next, in step 206, a return direction of the UAV may be determined on the basis of the plurality of detected distances from the base position to the respective destination positions. The UAV may compare the plurality of detected distances to identify an optimal direction as the return direction. The return direction may be one of the trial directions. Alternatively, the return direction may not be exactly one of the trial directions, but can be determined on the basis of the trial directions.

Afterwards, in step 208, the UAV may fly a second predetermined distance along the return direction to get closer to the base position. In some embodiments, the first predetermined distance may be shorter than the second predetermined distance.

After flying the second predetermined distance along the return direction, the UAV may arrive at an intermediate position between the initial position and the base position. In step 210, the UAV may detect the distance between the intermediate position and the base position, and compare the distance with a threshold distance. If the distance is smaller than or equal to the threshold distance, it is indicated that the UAV is close enough to the base position and no further return flight is needed. The threshold distance may be preconfigured by an operator of the UAV. For example, the threshold distance may be 0.5 meter, 1 meter or of other values. Accordingly, the process may end. However, if the distance is greater than the threshold distance, it is indicated that the UAV is still far away from the base position and further return flight towards the base position is needed. In this situation, the intermediate position may be regarded as a new initial position of the UAV and steps 202 to 208 may be repeated again.

In practice, steps 202 to 208 may be repeated for several times, unless the distance from the UAV to the base position is smaller than or equal to the threshold distance. Moreover, as the return direction the UAV takes may vary during the return flight of the UAV towards the base position, the flight path of the UAV may appear serpentine, such as a zigzag path.

It can be seen that if the second predetermined distance in step 208 is relatively short, the UAV may need to spend more cycles of steps 202 to 208 in its return flight. Moreover, if the second predetermined distance is relatively long, the flight path is more serpentine. Accordingly, in some embodiments, the operator may set, before or during the return flight, the value of the second predetermined distance according to his or her requirement. For example, the second predetermined distance may be of a constant value such as 1 meter, 2 meters, 5 meters, 10 meters, 30 meters, 100 meters, etc.

In some embodiments, the second predetermined distance may be calculated by the UAV according to a built-in algorithm. For example, the UAV may calculate how many cycles of steps 202 to 208 may be desired for the return flight, based on the distance from the initial position of the UAV to the base position. Accordingly, the UAV may update the value of the second predetermined distance during the return flight. In some other embodiments, the second predetermined distance may be of a predetermined ratio with respect to the distance between the initial position of the UAV and the base position, and the UAV may calculate the second predetermined distance using the built-in algorithm. Accordingly, the second predetermined distance may become shorter when the UAV approaches to the base position.

The return direction of the UAV can be determined in various manners according to different examples of the present application.

Figure 3:
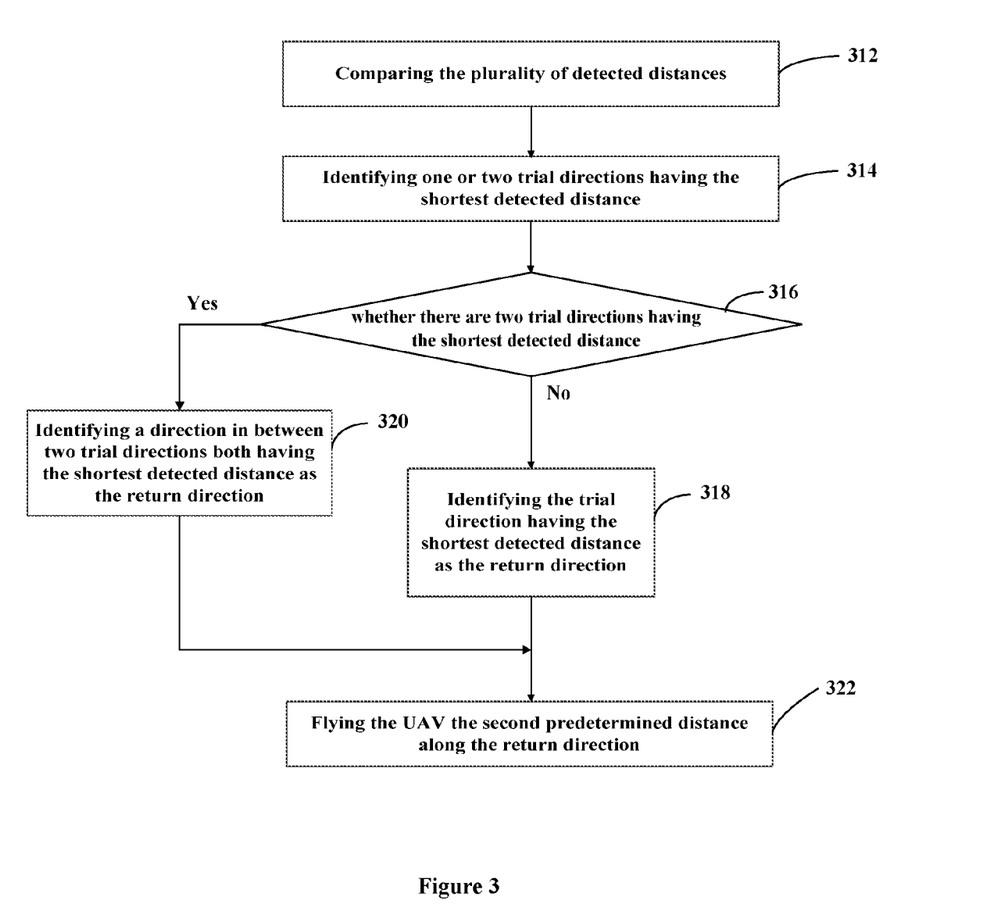
FIG. 3 shows a flow chart of a process of identifying a return direction of the UAV according to an example of the present application.

FIG. 3 shows a flow chart of a process of determining a return direction of the UAV according to an example of the present application.

Figure 4:
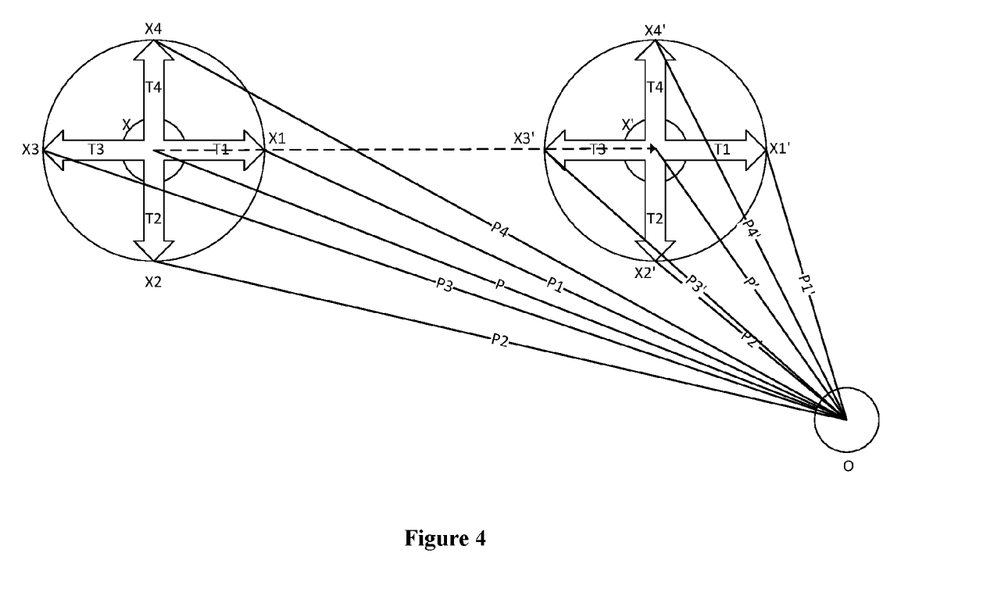
FIG. 4 shows a first exemplary flight path of the UAV in accordance with the process of FIG. 3.
Figure 5:
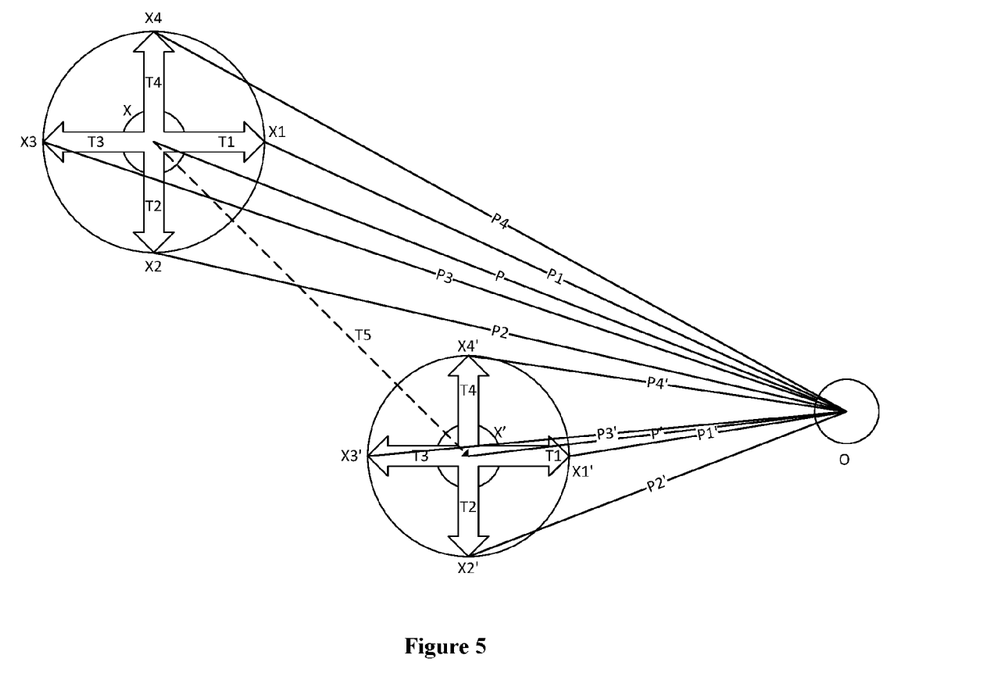
FIG. 5 shows a second exemplary flight path of the UAV in accordance with the process of FIG. 3.

FIGS. 4 and 5 show two exemplary flight paths of the UAV in accordance with the process of FIG. 3. In these two examples, four trial directions, which are all in the same vertical plane, have been taken by the UAV in order to determine the return direction, and each two adjacent trial directions of the four trial directions have an angle of 90 degrees. It should be noted that the angle of 90 degrees may include, for example, an angle within a range from 85 to 95 degrees, which may be regarded as an acceptable approximate range of the angle of 90 degrees in practice. It should also be noted that the number of the trial directions is exemplarily described and not intended to be construed as a limitation, and any number of the trial directions may be taken by the UAV to implement the process.

As shown in FIG. 3, after obtaining the plurality of detected distances corresponding to the plurality of destination positions, in step 312, the plurality of detected distances are compared with each other.

Next, in step 314, one or two trial directions having the shortest detected distance among the plurality of trial directions may be identified according to the comparison of step 312.

In step 316, it is determined whether there are two trial directions both having the shortest detected distance. In some embodiments, if there are two trial directions having two shortest distances which are substantially the same, step 316 will still decide yes. If no, the process goes to step 318 and the trial direction having the shortest detected distance may be identified as the return direction. If yes, the process goes to step 320 and a direction between the two trial directions both having the shortest distance may be identified as the return direction. The direction between the two trial directions is also directed from the initial position.

After the return direction has been identified, the UAV may fly along the return direction a second predetermined distance in step 322.

The flight path shown in FIG. 4 depicts a situation where only one trial direction T1 has the shortest distance among four trial directions T1, T2, T3 and T4.

Specifically, when the UAV is at an initial position X, it receives a return command instructing it to fly back towards a base position O. For example, the return command is transmitted from the remote terminal which is at the base position O. The base position O has a distance P away from the initial position X. In response to the return command, the UAV determines a return direction for its return flight using the method shown in FIG. 3. The UAV may first fly along the first trial direction T1 which is a rightward direction with respect to the initial position. After flying a first predetermined distance, the UAV arrives at a first destination position X1 and detects a first detected distance P1 from the first destination position X1 to the base position O. Afterwards, the UAV flies back to the initial position X. In a similar manner, the UAV flies along a second trial direction T2, which is a downward direction with respect to the initial position, to a second destination position X2, and detects a second detected distance P2. The UAV flies along a third trial direction T3 which is a leftward direction with respect to the initial position, to a third destination position X3, and detects a third detected distance P3. Furthermore, the UAV flies along a four trial direction T4 which is an upward direction with respect to the initial position, to a fourth destination position X4, and detects a fourth detected distance P4.

After the trial flights along the respective trial directions T1, T2, T3 and T4, the respective detected distances P1, P2, P3 and P4 may be compared with each other. As a result, it is found that the first detected distance P1 is shortest among the detected distances P1, P2, P3 and P4. Accordingly, the UAV may select the first trial direction as the return direction. Thus, the UAV flies a second predetermined distance along the first trial direction T1, to a position X' which is closer to the base position O. In the embodiment, the second predetermined distance is selected greater than a half of the distance P. Preferably, the second predetermined distance is greater than the first predetermined distance.

It should be noted that, after the fourth detected distance P4 has been determined, the UAV may fly back to the initial position X to prepare for the return flight towards the base position O. Alternatively, the UAV may fly directly from the fourth destination position X4 towards the base position O, along the identified return direction.

The UAV may repeat the previous process to determine a new return flight and then fly along the new return direction. After several cycles, the UAV may fly to the base position or a position near the base position O, and then the return flight may end.

As mentioned above, in some examples, the UAV may not fly back to the initial position X after it flies to a destination position such as X1. Instead, the UAV may fly directly from the first destination position X1 to the second destination position X2, further fly directly from the second destination position X2 to the third destination position X3, and further directly from the third destination position X3 to the fourth destination position X4. The trial directions corresponds to the destination positions X1 to X4 may be determined based on the initial position X and the destination positions X1 to X4, for example, using their respective coordinates in a GPS coordinate system.

The flight path shown in FIG. 5 depicts another situation where two detected distances P1 and P2 for the respective trial directions T1 and T2 are substantially equal to each other, and are both shorter than the other two distances P3 and P4.

Following the process shown in FIG. 3, a direction T5 between the first trial direction T1 and the second trial direction T2 may be determined as the return direction for the UAV. Out of the four trial directions, the trial directions T1 and T2 offer two shortest detected distance (either identical or substantially identical) to the base position O. Preferably, the direction T5 may be in the middle of the first trial direction T1 and the second trial direction T2. In other words, an angle between the first trial direction T1 and the direction T5 may be equal to another angle between the second trial direction T2 and the direction T5. Accordingly, the UAV may fly along the direction T5 the second predetermined distance, to a position X' closer to the base position O. The UAV may repeat the previous process to determine a new return flight and then fly along the new return direction. After several cycles, the UAV may fly to the base position O or a position near the base position O, and then the return flight may end.

In some alternative examples, the UAV may select either the first trial direction T1 or the second trial direction T2 as the return direction if the two trial direction both have the shortest detected distance from the base position O.

The return direction for the UAV may be determined in other manners.

Figure 6:
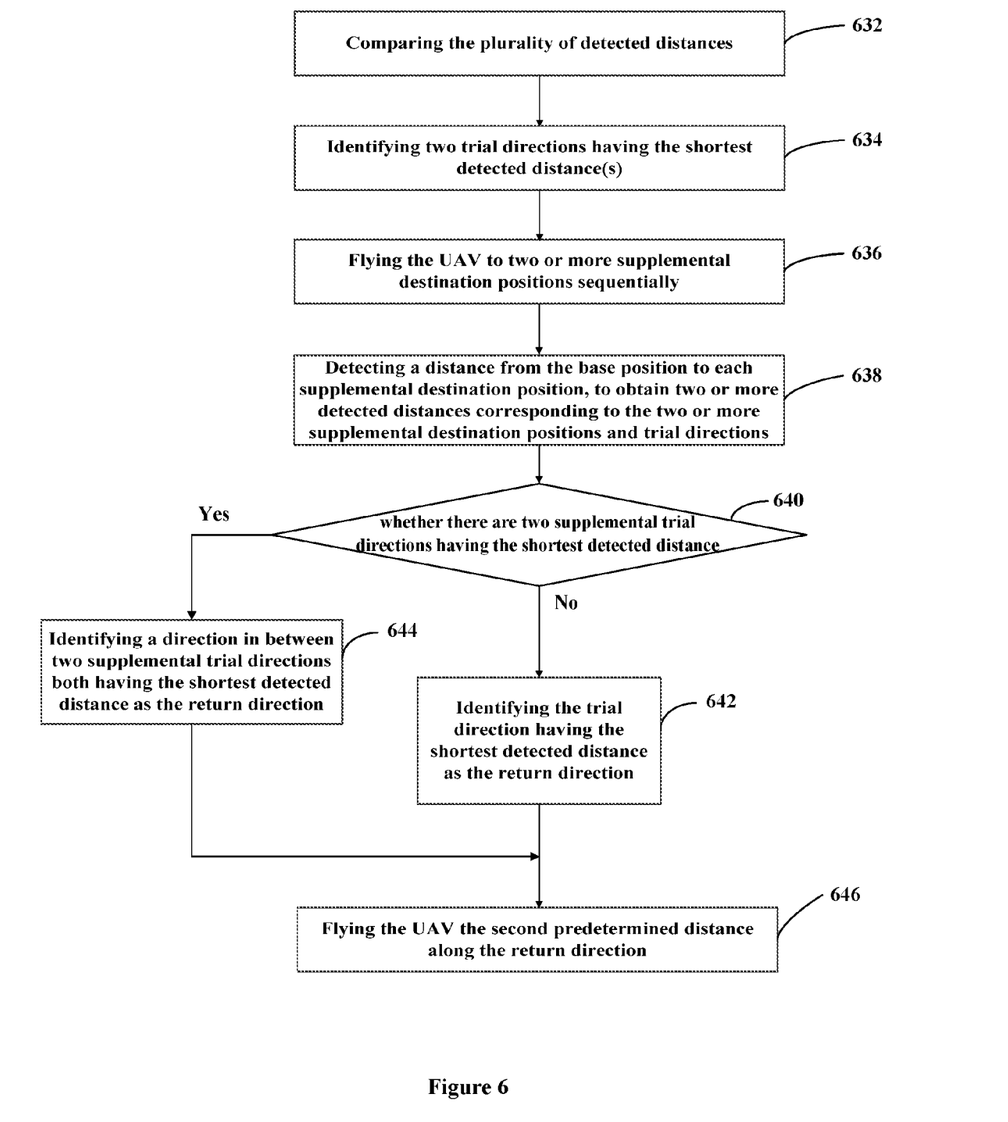
FIG. 6 shows a flow chart of a process of determining a return direction of the UAV according to another example of the present application.

FIG. 6 shows a flow chart of a process of determining a return direction of the UAV according to another example of the present application.

Figure 7:
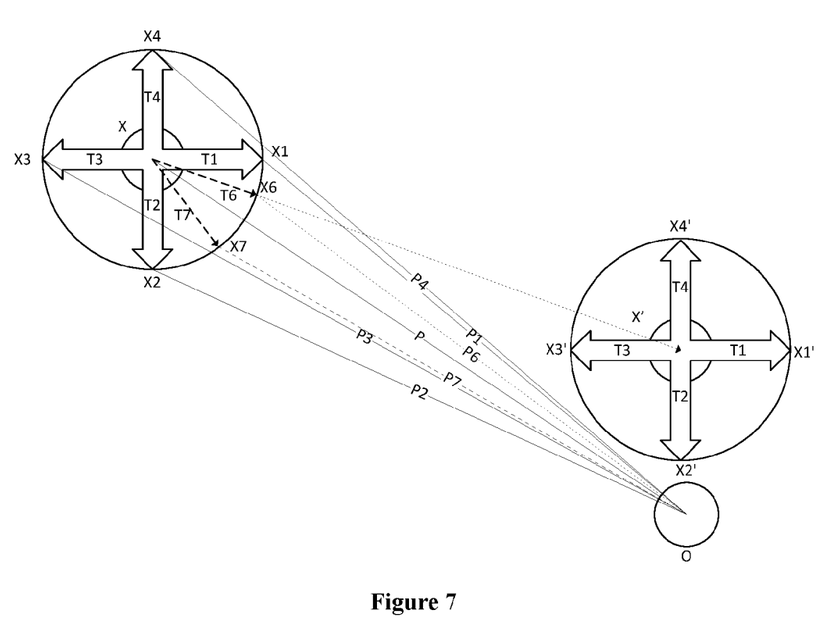
FIG. 7 shows a first exemplary flight path of the UAV in accordance with the process of FIG. 6.
Figure 8:
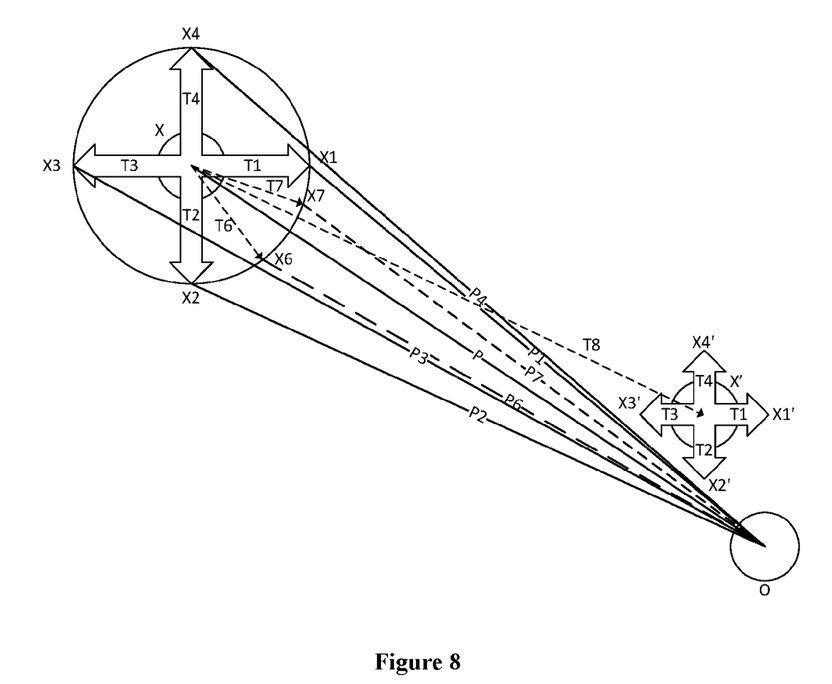
FIG. 8 shows a second exemplary flight path of the UAV in accordance with the process of FIG. 6.

FIGS. 7 and 8 show two exemplary flight paths of the UAV in accordance with the process of FIG. 6. In these two examples, the determination of the return direction is implemented with two stages. At a first stage, four destination positions each corresponding to four respective trial directions have been taken by the UAV, and each two adjacent trial directions of the four trial directions have an angle of 90 degrees. It should also be noted that the number of the trial directions is exemplarily described and not intended to be construed as a limitation, and any number of the trial directions may be taken by the UAV to implement the process. At a second stage, two destination positions corresponding to two respective supplemental trial directions, which are selected based on the four trial directions taken by UAV at the first stage, may be taken into account by the UAV so as to identify the return direction.

As shown in FIG. 6, after obtaining the plurality of detected distances corresponding to the plurality of trial directions, in step 632, the plurality of detected distances are compared with each other.

Next, in step 634, two trial directions both having the shortest detected distance(s) among the plurality of trial directions may be identified. In some embodiments, it will identify two trial directions having two shortest distances which are substantially the same.

In step 636, the UAV flies to two or more supplemental destination positions sequentially. Each of the two or more supplemental destination positions has a third predetermined distance from the initial position, and the two or more supplemental destination positions correspond to two or more supplemental trial directions respectively. For example, the UAV may fly the third predetermined distance along two or more supplemental trial directions between the identified two trial directions respectively. The supplemental trial directions are distributed between the two trial directions having the shortest detected distance(s). Preferably, the number of the supplemental trial directions may be two, but in some other embodiments, the number of the supplemental trial direction may be three or more.

In step 638, for each supplemental destination position, a distance from the base position to the destination position when the UAV is at the destination position is detected. Accordingly, two or more detected distance corresponding to the two or more supplemental destination positions and trial directions can be obtained.

Next, in step 640, the two or more detected distances detected in step 638 may be compared with each other to determine whether there are two supplemental trial directions having the shortest detected distance. If no, the process goes to step 642 and the supplemental trial direction having the shortest detected distance among the supplemental trial directions may be identified as the return direction. If yes, the process goes to step 644 and a direction between the two supplemental trial directions having the shortest detected distance may be identified as the return direction. In some embodiments, it will identify two supplemental trial directions having two shortest distances which are substantially the same. Alternatively, either of the two supplemental trial directions having the shortest detected distance may be identified as the return direction.

After the return direction has been identified, the UAV may fly along the return direction a second predetermined distance in step 646.

The flight path shown in FIG. 7 depicts a situation where only one supplemental trial direction T6 has the shortest distance among two supplemental trial directions T6 and T7.

Specifically, the UAV flies a first predetermined distance along four trial directions T1, T2, T3 and T4 and arrives at four destination positions X1, X2, X3 and X4, respectively. For each of the destination positions X1, X2, X3 and X4, a distance from the UAV to the base position O is detected, and thus, four detected distances P1, P2, P3 and P4 are obtained. After comparing the detected distances P1, P2, P3 and P4 with each other, it is found that two trial directions T1 and T2 have the shortest detected distance(s). In practice, the detected distance P1 may or may not be equal to the detected distance P2.

Next, two supplemental trial directions P6 and P7, which are distributed between the first and second trial directions T1 and T2, are selected. The selection of the supplemental trial directions may be random or based on a predetermined rule. Afterwards, the UAV flies a third predetermined distance along the two supplemental trial directions T6 and T7, and arrives at two respective supplemental destination positions X6 and X7.

In one preferable embodiment, the UAV may fly back to its initial position X after flying to each supplemental destination position. Alternatively, the UAV does not fly back to the initial position X after flying to each supplemental destination position. Instead, the UAV may fly to a next supplemental destination position calculated according to a next supplemental trial direction. In other words, the UAV's previous flight track is recorded in order to adjust the next supplemental trail direction and the third predetermined distance along the next supplemental trial direction.

In the example shown in FIG. 6, the third predetermined distance may be equal to the first predetermined distance. However, in some other embodiments, the third predetermined distance may be not equal to the first predetermined distance.

As shown in FIG. 7, when the UAV is at a supplemental destination position corresponding to each supplemental trial direction, the distance between the UAV and the base position O is detected as well, i.e. a sixth detected distance P6 for the supplemental trial direction T6 and a detected seventh distance P7 for the supplemental trial direction T7 can be obtained. After comparing the sixth and seventh detected distances P6 and P7, it is found that the six detected distance P6 is shorter than the seventh detected distance P7. Accordingly, the UAV may select the supplemental trial direction T6 as the return direction for its return flight. Thus, the UAV flies a second predetermined distance along the supplemental trial direction T6, to a position X' which is closer to the base position O. The UAV may repeat the previous process to determine a new return flight and then fly along the new return direction. After several cycles, the UAV may fly to the base position O or a position near the base position O, and then the return flight may end.

The flight path shown in FIG. 8 depicts another situation where two detected distances P6 and P7 corresponding to two respective supplemental trial directions T6 and T7 are substantially equal to each other. Following the process shown in FIG. 6, a direction T8 between the two supplemental trial directions T6 and T7 may be determined as the return direction for the UAV. In some embodiments, the direction T8 may be in the middle of the two supplemental trial directions T6 and T7. Accordingly, the UAV may fly along the direction T8 the second predetermined distance, to a position X' closer to the base position O. The UAV may repeat the previous process to determine a new return flight and then fly along the new return direction. After several cycles, the UAV may fly to the base position O or to a position near the base position O, and then the return flight may end.

In an alternative example, either of the two supplemental trial directions T6 and T7 may be identified as the return direction when they both have the shortest detected distance away from the base position O.

Figure 9:
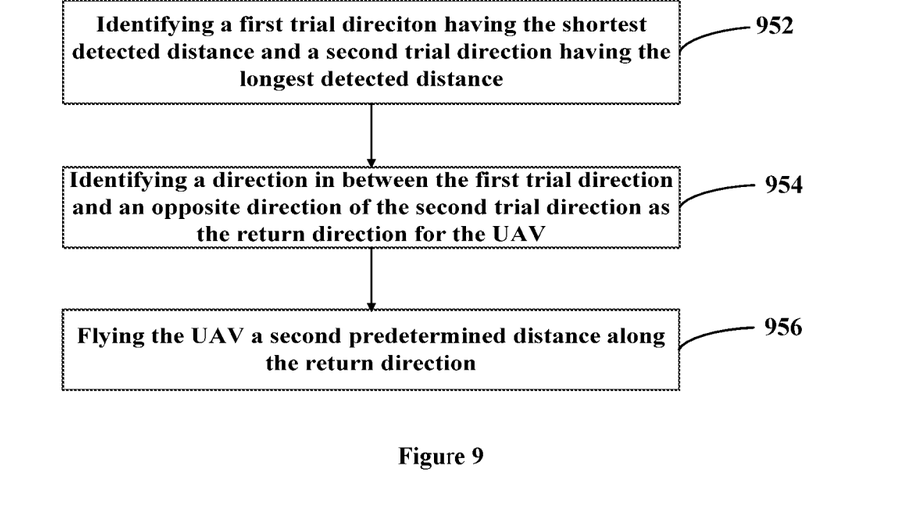
FIG. 9 shows a flow chart of a process of determining a return direction of the UAV according to a further example of the present application.

FIG. 9 shows a flow chart of a process of determining a return direction of the UAV according to a further example of the present application.

Figure 10:
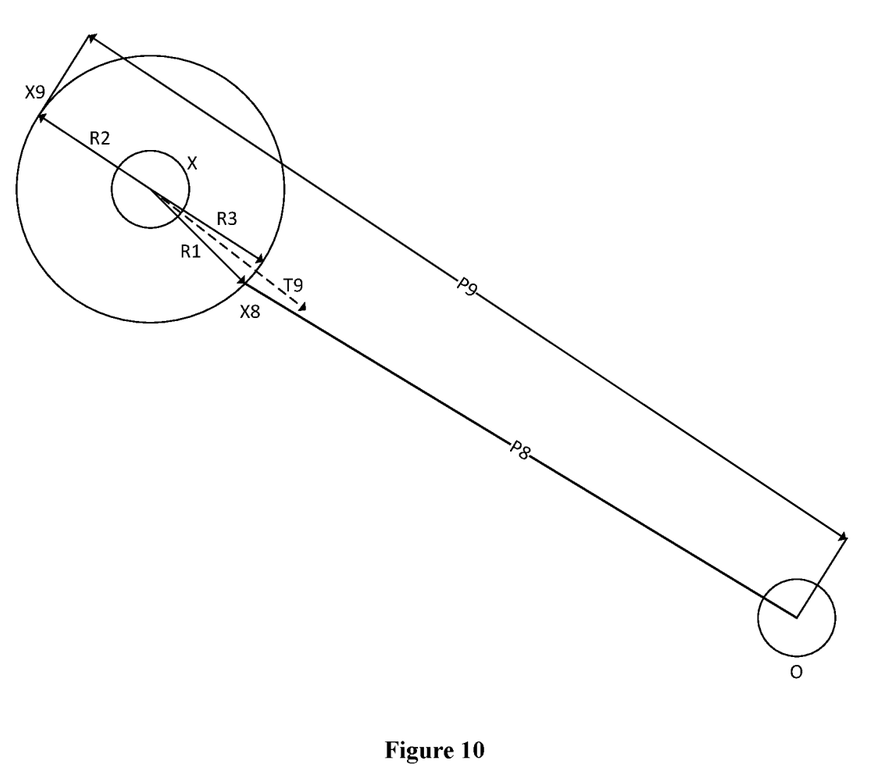
FIG. 10 shows an exemplary flight path of the UAV in accordance with the process of FIG. 9.

FIG. 10 shows an exemplary flight path of the UAV in accordance with the process of FIG. 9.

As mentioned above, the plurality of destination positions where the UAV flies to may be approximately located at a circle centered at the initial position of the UAV. For example, the UAV may fly a first predetermined distance along a plurality of trial directions which are in the same plane to the plurality of destination positions. Among the plurality destination positions, there may be a first destination position having the longest detected distance away from the base position, and a second destination position having the shortest detected distance away from the base position. Accordingly, the return flight of the UAV may be determined on the basis of the two trial directions corresponding to the first and second destination positions.

Specifically, with reference to FIGS. 9 and 10, in step 952, a first trial direction R1 having the shortest detected distance P8 from a first destination position X8 to the base position O, and a second trial direction R2 having the longest detected distance P9 from a second destination position X9 to the base position O can be identified. The first trial direction R1 corresponds to an opposite direction R3. Specifically, the second trial direction R2 is directed from the initial position X to the second destination position X9, while its opposite direction R3 is directed from the second destination position X9 to the initial position X. It can be seen from FIG. 10, both the first trial direction R1 and the direction R3 are directed towards the base position O or a place near the base position O. If flying along a direction between the first trial direction R1 and the direction R3, the UAV may get much closer to the base position O.

Next, in step 954, a direction T9 between the first trial direction R1 and the direction R3 is identified as the return direction for the UAV In some embodiments, the return direction T9 may be in the middle of the first trial direction R1 and the direction R3. In some situations, the first trial direction may coincide with the opposite direction of the second trial direction. Accordingly, the return direction may coincide with the first trial direction and the opposite direction of the second as well.

Next, in step 956, the UAV may fly along the identified return direction R9 a second predetermined distance.

The UAV may repeat the process of steps 952 to 956 to determine a new return flight and then fly along the new return direction. After several cycles, the UAV may fly to the base position O or to a position near the base position O, and then the return flight may end.

It should be noted that, for each of the exemplary flight paths shown in FIGS. 4, 5, 7, 8 and 10, the trial directions or the supplemental trial directions for one cycle of the determination of the return direction are all in the same vertical plane. However, the trial directions or the supplemental trial directions may not be in the same plane, or for different cycles of determination of the return direction, their corresponding trial directions (i.e. destination positions) may not be in the same plane. For example, for a first cycle of determination of a first return direction, the trial directions and the destination positions may be in a vertical plane, and for a second cycle of determination of a second return direction, the trial direction and the destination positions may be in a horizontal plane.

With the method for navigating the UAV according to the embodiments of the present application, the UAV may take some trial flights to a plurality of destination positions corresponding to a plurality of trial directions, so as to determine an optimal return flight towards a base position. The UAV may then fly along the identified return direction a distance to get closer to the base position. In practice, the UAV may repeat the process for several times, unless it gets close enough to the base position. Since the distance from the UAV to the base position can be updated dynamically during the return flight of the UAV, the return direction of the UAV may be changed responsive to the change of the base position. Thus, the UAV can accurately track a target such as a remote terminal at the base position even if the base position changes.

Furthermore, it can be seen that it is desired to determine a position of the UAV relative to the base position, instead of an absolute position detected by an absolute positioning system such as the GPS system. Thus, the UAV can use distance measurement devices other than a GPS device which costs high. For example, the UAV may use the communication unit 110 of FIG. 1 to communicate with a remote terminal at the base position, and determine its distance from the remote terminal by calculating a distance travelled by a signal transmitted therebetween. Such distance measurement method is more accurate compared with the absolute positioning method, which improves the navigation of the UAV. However, it would be readily appreciated by people skilled in the art that the method can alternatively be implemented by using a GPS system.

Figure 11:
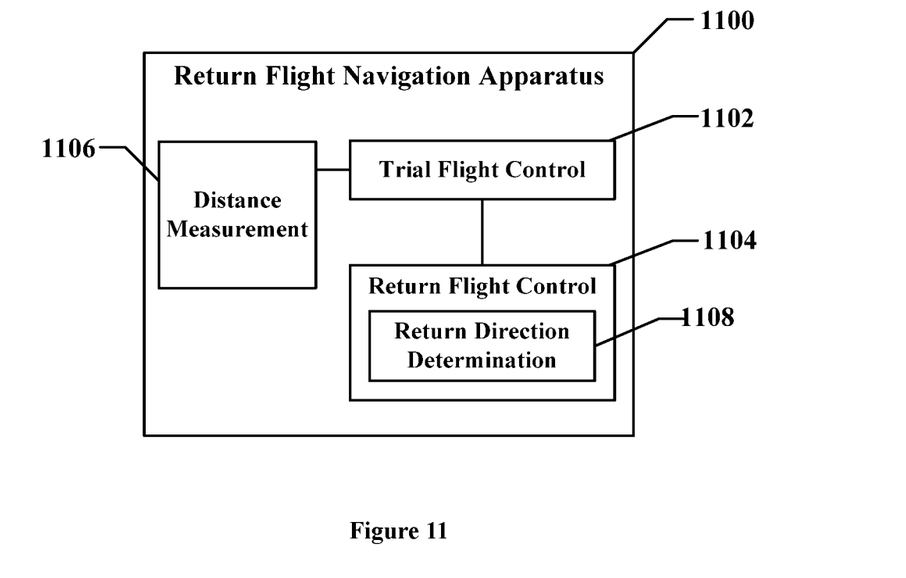
FIG. 11 shows a block diagram of an apparatus for navigating a UAV according to an embodiment of the present application.

FIG. 11 shows a block diagram of an apparatus 1100 for navigating a UAV from an initial position towards a base position according to an embodiment of the present application. The apparatus 1100 may be used to implement the navigation methods of the embodiments of the present application described above. In As shown in FIG. 11, the apparatus 1100 include a trial flight control unit 1102, a return flight control unit 1104 and a distance measurement unit 1106.

The trial flight control unit 1102 is used to control the UAV to a plurality of destination positions each having a first predetermined distance from an initial position of the UAV. The plurality of destination positions correspond to a plurality of trial directions with respect to the initial position, respectively.

The return flight control unit 1104 is used to control the UAV to detect, for each of the plurality of destination positions, a distance from the base position to the destination position when the UAV is at the destination position, thereby to obtain a plurality of detected distances correspond to the plurality of trial directions, respectively. The detection of the distance from a destination position to the base position can be conducted, for example, by the distance measurement unit 1106.

The return flight control unit 1104 includes a return direction determination unit 1108, which is used to determine a return direction of the UAV on the basis of the plurality of detected distances from the base position to the respective destination positions corresponding to the plurality of trial directions. The return flight control unit 1104 further controls the UAV to fly a second predetermined distance along the determined return direction.

In some embodiments, the apparatus 1100 may be integrated within the UAV, and in some other embodiments, the apparatus 1100 may be integrated within a remote terminal in wireless communication with the UAV.

Those skilled in the art may understand and implement other variations to the disclosed embodiments from a study of the drawings, the present application, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A method for navigating an unmanned aerial vehicle (UAV) from an initial position of the UAV towards a base position, comprising:
   A) flying the UAV to a plurality of destination positions each having a first predetermined distance from the initial position of the UAV, wherein the plurality of destination positions correspond to a plurality of trial directions with respect to the initial position, respectively;
   B) detecting, for each of the plurality of destination positions, a distance from the base position to the destination position when the UAV is at the destination position, thereby to obtain a plurality of detected distances corresponding to the plurality of trial directions, respectively;
   C) determining a return direction of the UAV on the basis of the plurality of detected distances, wherein the return direction is substantially directed towards the base position; and
   D) flying the UAV a second predetermined distance along the return direction such that the UAV is relatively closer to the base position.

2. The method of claim 1, further comprising:
   repeating steps A to D, unless the distance from the UAV to the base position is smaller than or equal to a threshold distance.

3. The method of claim 1, wherein step A further comprises flying the UAV along one of the plurality of trial directions to one of the plurality of destination positions, and flying the UAV from the destination position back to the initial position.

4. The method of claim 1, wherein the plurality of destination positions are approximately located at a circle centered at the initial position of the UAV.

5. The method of claim 4, wherein the plurality of trial directions comprise four trial directions, and wherein each two adjacent trial directions of the four trial directions have an angle of 90 degrees.

6. The method of claim 1, wherein step A further comprises: after the UAV arrives at one of the plurality of destination positions, flying the UAV directly to a next destination position without flying the UAV back to the initial position.

7. The method of claim 6, wherein UAV's flight tracks to previous destination positions are considered in order to adjust a next direction and the first predetermined distance to be flied by UAV along the next direction.

8. The method of claim 7, wherein the plurality of destination positions are approximately located at a circle centered at the initial position of the UAV.

9. The method of claim 1, wherein step C comprises:
   C1) comparing the plurality of detected distances; and
   C2) identifying a trial direction having the shortest detected distance among the plurality of trial directions as the return direction, according to the comparison of the plurality of detected distances, or identifying a direction between two trial directions which both have the shortest detected distance among the plurality of trial directions as the return direction, according to the comparison of the plurality of detected distances.

10. The method of claim 9, wherein the identified direction between the two trial directions both having the shortest detected distance is in the middle of the two trial directions.

11. The method of claim 1, wherein step C comprises:
C1) comparing the plurality of detected distances;
C2) identifying two trial directions both having the shortest detected distance among the plurality of trial directions;
C3) flying the UAV to two or more supplemental destination positions each having a third predetermined distance from the initial position, wherein the two or more supplemental destination positions correspond to two or more respective supplemental trial directions with respect to the initial position, and wherein the two or more supplemental trial directions are between the identified two trial directions;
C4) detecting, for each supplemental destination position, a distance from the base position to the supplemental destination position when the UAV is at the supplemental destination position, thereby to obtain two or more detected distances corresponding to the two or more supplemental trial directions, respectively; and
C5) determining the return direction of the UAV on the basis of the two or more detected distances.

12. The method of claim 11, wherein step C5 of determining the return direction of the UAV comprises:
comparing the two or more detected distances; and
identifying a supplemental trial direction having the shortest detected distance among the two or more supplemental trial directions as the return direction, according to the comparison of the two or more detected distances, or
identifying a direction between two supplemental trial directions both having the shortest detected distance among the two or more supplemental trial directions as the return direction, according to the comparison of the two or more detected distances.

13. The method of claim 12, wherein the identified direction between the two supplemental trial directions both having the shortest detected distance is in the middle of the two supplemental trial directions.

14. The method of claim 11, wherein the third predetermined distance is shorter than the second predetermined distance.

15. The method of claim 11, wherein the third predetermined distance is equal to the first predetermined distance.

16. The method of claim 11, wherein step C3 further comprises: flying the UAV along one of the two or more supplemental trial directions to one of the two or more supplemental destination positions, and flying the UAV from the supplemental destination position back to the initial position.

17. The method of claim 11, wherein step C3 further comprises: after the UAV arrives at one of the two or more supplemental destination positions, flying the UAV directly to a next destination position without flying the UAV back to the initial position.

18. The method of claim 4, wherein step C further comprises:

identifying a first trial direction having the shortest detected distance and a second trial direction having the longest detected distance among the plurality of trial directions, and
identifying a direction between the first trial direction and an opposite direction of the second trial direction as the return direction.

19. The method of claim 18, wherein the identified return direction is in the middle of the first trial direction and the opposite direction of the second trial direction.

20. The method of claim 1, wherein the first predetermined distance is shorter than the second predetermined distance.

21. The method of claim 1, wherein the UAV is in wireless communication with a remote terminal positioned at the base position, and wherein detecting the distance from the UAV to the base position comprises:
transmitting a distance measurement signal from the UAV to the remote terminal, wherein the distance measurement signal contains a first time at which the distance measurement signal is transmitted;
receiving the distance measurement signal by the remote terminal and determining a second time at which the distance measurement signal is received; and
calculating the distance from the UAV to the remote terminal at the base position using the first time and the second time.

22. The method of claim 1, wherein the UAV is in wireless communication with a remote terminal positioned at the base position, and wherein detecting the distance from the UAV to the base position comprises:
transmitting a distance measurement signal from the remote terminal to the UAV, wherein the distance measurement signal contains a first time at which the distance measurement signal is transmitted;
receiving the distance measurement signal by the UAV and determining a second time at which the distance measurement signal is received; and
calculating the distance from the UAV to the remote terminal at the base position using the first time and the second time.

23. The method of claim 1, wherein the initial position of the UAV is out of a predetermined scope which the UAV is permitted to fly within.

24. The method of claim 1, wherein the plurality of trial directions are determined by the UAV based on the initial position and the plurality of destination positions, respectively.

25. An apparatus for navigating a UAV from an initial position of the UAV towards a base position, the apparatus comprising a processor and a memory for storing executable instructions that, when executed by the processor, causes the UAV to perform:
A) flying the UAV to a plurality of destination positions each having a first predetermined distance from the initial position of the UAV, wherein the plurality of destination positions correspond to a plurality of trial directions with respect to the initial position, respectively;
B) detecting, for each of the plurality of destination positions, a distance from the base position to the destination position when the UAV is at the destination position, thereby to obtain a plurality of detected distances corresponding to the plurality of trial directions, respectively;

C) determining a return direction of the UAV on the basis of the plurality of detected distances, wherein the return direction is substantially directed towards the base position; and D) flying the UAV a second predetermined distance along the return direction such that the UAV is relatively closer to the base position.

26. A UAV comprising:

an apparatus for navigating a UAV from an initial position of the UAV towards a base position, the apparatus comprising a processor and a memory for storing executable instructions that, when executed by the processor, causes the UAV to perform:

A) flying the UAV to a plurality of destination positions each having a first predetermined distance from the initial position of the UAV, wherein the plurality of destination positions correspond to a plurality of trial directions with respect to the initial position, respectively;

B) detecting, for each of the plurality of destination positions, a distance from the base position to the destination position when the UAV is at the destination position, thereby to obtain a plurality of detected distances corresponding to the plurality of trial directions, respectively;

C) determining a return direction of the UAV on the basis of the plurality of detected distances, wherein the return direction is substantially directed towards the base position; and D) flying the UAV a second predetermined distance along the return direction such that the UAV is relatively closer to the base position; and a communication unit for wireless communication.

27. The UAV of claim 26, wherein the UAV is in wireless communication with a remote terminal positioned at the base position, and the UAV is further configured to perform:

receiving a distance measurement signal sent by the remote terminal, wherein the distance measurement signal contains a first time at which the distance measurement signal is transmitted, determining a second time at which the distance measurement signal is received; and calculating the distance from the UAV to the remote terminal using the first time and the second time.

28. A remote terminal comprising:

an apparatus for navigating a UAV from an initial position of the UAV towards a base position, the apparatus comprising a processor and a memory for storing executable instructions that, when executed by the processor, causes the UAV to perform:

A) flying the UAV to a plurality of destination positions each having a first predetermined distance from the initial position of the UAV, wherein the plurality of destination positions correspond to a plurality of trial directions with respect to the initial position, respectively;

B) detecting, for each of the plurality of destination positions, a distance from the base position to the destination position when the UAV is at the destination position, thereby to obtain a plurality of detected distances corresponding to the plurality of trial directions, respectively;

C) determining a return direction of the UAV on the basis of the plurality of detected distances, wherein the return direction is substantially directed towards the base position; and D) flying the UAV a second predetermined distance along the return direction such that the UAV is relatively closer to the base position; and a communication unit for wireless communication.

29. The remote terminal of claim 28, wherein the remote terminal is in wireless communication with the UAV and is positioned at the base position, and the remote terminal is further configured to perform:

receiving a distance measurement signal sent by the UAV, wherein the distance measurement signal contains a first time at which the distance measurement signal is transmitted, determining a second time at which the distance measurement signal is received; and calculating the distance from the UAV to the remote terminal using the first time and the second time.

* * * * *